United States Patent
Chang

(10) Patent No.: US 8,130,209 B2
(45) Date of Patent: Mar. 6, 2012

(54) LIQUID CRYSTAL DISPLAY PANEL AND METHOD FOR MANUFACTURING THE SAME

(75) Inventor: Jong-Woong Chang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 948 days.

(21) Appl. No.: 12/024,291

(22) Filed: Feb. 1, 2008

(65) Prior Publication Data

US 2008/0186288 A1    Aug. 7, 2008

(30) Foreign Application Priority Data

Feb. 7, 2007    (KR) .................. 10-2007-0012621

(51) Int. Cl.
*G06F 3/045* (2006.01)
(52) U.S. Cl. ........ 345/174; 345/173; 345/205; 345/206; 349/12; 178/18.01; 178/18.06; 178/18.09
(58) Field of Classification Search .......... 345/173–178, 345/204–215; 349/12; 178/18.01–18.09
See application file for complete search history.

(56) References Cited

U.S. PATENT DOCUMENTS

| | | | | |
|---|---|---|---|---|
| 6,501,529 B1* | 12/2002 | Kurihara et al. | ............ | 349/160 |
| 7,675,580 B2* | 3/2010 | Rho | ................ | 349/12 |
| 7,903,096 B2* | 3/2011 | Jeon et al. | ............... | 345/174 |
| 2003/0128323 A1* | 7/2003 | Matsumoto et al. | ......... | 349/141 |
| 2006/0017710 A1* | 1/2006 | Lee et al. | ............... | 345/173 |
| 2007/0070047 A1* | 3/2007 | Jeon et al. | ............... | 345/173 |
| 2009/0174681 A1* | 7/2009 | Chang et al. | ............... | 345/173 |
| 2011/0025969 A1* | 2/2011 | Chen et al. | ............... | 349/139 |

FOREIGN PATENT DOCUMENTS

| | | |
|---|---|---|
| KR | 1020060009602 A | 2/2006 |
| KR | 1020060020497 A | 3/2006 |
| KR | 1020060033483 A | 4/2006 |

* cited by examiner

*Primary Examiner* — Lun-Yi Lao
*Assistant Examiner* — Priyank Shah
(74) *Attorney, Agent, or Firm* — Cantor Colburn LLP

(57) ABSTRACT

A liquid crystal display ("LCD") panel includes a touch spacer formed in a first substrate, a common electrode formed to cover the touch spacer, a first touch conductive line formed in a first direction in a second substrate opposite to the first substrate, a second touch conductive line formed in a second direction substantially perpendicular to the first touch conductive line, and first and second contact electrodes respectively electrically connected to the first and second touch conductive lines and portions of the first and second contact electrodes formed at a same height, wherein the portions of the first and second contact electrodes contact the common electrode by the touch spacer in a contact position. A method for manufacturing the LCD panel is also provided.

22 Claims, 14 Drawing Sheets

LIQUID CRYSTAL DISPLAY PANEL AND METHOD FOR MANUFACTURING THE SAME

This application claims priority to Korean Patent Application No. 2007-0012621, filed on Feb. 7, 2007, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") panel and method for manufacturing the same. More particularly, the present invention relates to an LCD panel in which input sensitivity is improved and a coordinating value detecting error is prevented, and a method for manufacturing the LCD panel.

2. Description of the Related Art

A touch screen panel is a type of information input means which inputs information when a user touches a screen. The touch screen panel is installed on an image display surface of a display device such as a liquid crystal display ("LCD") device, a field emission display ("FED") device, a plasma display panel ("PDP") device, and an electro luminescence device ("ELD").

The touch screen panel is classified into a capacitive touch screen panel and a resistive touch screen panel. The capacitive touch screen panel has one transparent conductive film or glass for storing electrical charges. When the capacitive touch screen panel is touched by, e.g., a stylus, a small amount of charge is drawn to a contact point between the stylus and the transparent conductive film. The amount of charge detected at the contact point is converted into coordinate values. In the resistive touch screen panel, when a user touches a screen in a state that a voltage is applied to two opposite conductive layers, the two conductive layers contact, and a change in voltage or electrical current occurs at the contact point. The change in voltage or electrical current is detected and converted into coordinate values.

In the capacitive touch screen panel, electricity should be supplied to a stylus. For this reason, the resistive touch screen panel of an analog input method, which is constructed integrally with an LCD panel, is usually used. The resistive touch screen panel may be formed inside an LCD panel in order to prevent brightness of the LCD panel from being degraded.

In an LCD panel with an integrated touch screen panel, first touch conductive lines and second touch conductive lines are formed in a matrix in a thin film transistor ("TFT") array substrate so that a first coordinate value which represents a horizontal contact point and a second coordinate value which represents a vertical contact point can be detected. Also, a touch spacer which contacts the first and second touch conductive lines is formed in a color filter array substrate. When the touch spacer does not contact both the first and second touch conductive lines, both a horizontal coordinate value and a vertical coordinate value are not accurately detected.

BRIEF SUMMARY OF THE INVENTION

Aspects of the invention provide a liquid crystal display ("LCD") panel in which input sensitivity is improved by forming first and second touch conductive lines at a same height, and coordinate values for a touch point can be accurately detected by a structure for preventing a coordinate value detecting error caused by a misalignment between the touch spacer and the first and second touch conductive lines.

Other aspects of the invention provide a method for manufacturing the LCD panel.

In exemplary embodiments of the present invention, an LCD panel includes a touch spacer formed in a first substrate, a common electrode formed to cover the touch spacer, a first touch conductive line formed in a first direction in a second substrate opposite to the first substrate, a second touch conductive line formed in a second direction perpendicular to the first touch conductive line, and first and second contact electrodes respectively electrically connected to the first and second touch conductive lines and portions of the first and second contact electrodes formed at a same height, wherein the portions of the first and second contact electrodes contact the common electrode by the touch spacer in a contact position.

The second substrate may include a gate line formed substantially in parallel with the first touch conductive line, a gate insulating layer formed to cover the first touch conductive line and the gate line, a data line formed on the gate insulating layer substantially in parallel with the second touch conductive line, a passivation film formed to cover the data line and having a first contact hole which exposes a portion of the data line, and a pixel electrode formed on the passivation film to be electrically connected to the data line.

The first and second touch conductive lines may be formed at a same level as the gate line and the data line, respectively, so that a step difference exists between the first and second touch conductive lines.

The first contact electrode may be formed on the passivation film and may be electrically connected to the first touch conductive line via a second contact hole which penetrates the passivation film and the gate insulating layer, and the second contact electrode may be formed on the passivation film and may be electrically connected to the second touch conductive line via a third contact hole.

In other exemplary embodiments, the present invention provides a method for manufacturing an LCD panel, the method including forming a touch spacer in a first substrate, forming a common electrode to cover the touch spacer, forming a gate metal pattern having a gate line, a gate electrode, and a first touch conductive line in a second substrate opposite to the first substrate, forming a data metal pattern having a data line, a source electrode, a drain electrode, and a second touch conductive line over the gate metal pattern, forming a passivation film to cover the data metal pattern, the passivation film having first to third contact holes which expose a portion of the drain electrode and portions of the first and second touch conductive lines, respectively, and forming first and second contact electrodes on the passivation film at a same height within the second substrate, the first and second contact electrodes respectively electrically connected to the first and second touch conductive lines.

The method may further include, before forming the data metal pattern, forming a gate insulating layer to cover the gate metal pattern, and forming a semiconductor layer on a portion of the gate insulating layer over the gate electrode.

The first and second contact electrodes may be formed at a same time as a pixel electrode electrically connected to the drain electrode via the first contact hole.

The first contact electrode may include a first electrode contact portion electrically connected to the first touch conductive line via the second contact hole and a first electrode extending portion extending from the first electrode contact portion, and the second contact electrode may include a second electrode contact portion electrically connected to the second touch conductive line via the third contact hole and a second electrode extending portion extending from the second electrode contact portion, wherein the first and second electrode extending portions may have a plurality of adjacent surfaces with respect to each other.

The first contact electrode may include a first electrode contact portion electrically connected to the first touch conductive line via the second contact hole and a first electrode extending portion extending from the first electrode contact portion, and the second contact electrode may include a second electrode contact portion electrically connected to the second touch conductive line via the third contact hole and a second electrode extending portion extending from the second electrode contact portion, wherein the first and second electrode extending portions may be alternately arranged.

The first contact electrode may include a first electrode contact portion electrically connected to the first touch conductive line via the second contact hole and a first electrode extending portion extending from the first electrode contact portion, and the second contact electrode may include a second electrode contact portion electrically connected to the second touch conductive line via the third contact hole and a second electrode extending portion extending from the second electrode contact portion, wherein the first and second electrode extending portions may be arranged in a form for engaging with each other. The first and second electrode extending portions may be formed at the same height within the second substrate by the gate insulating layer and the passivation film.

The first electrode extending portion may include one or more first electrode extending portions and the second electrode extending portion may include one or more second electrode extending portions.

The first and second contact electrodes may be formed such that at least one first electrode extending portion protrudes from the first electrode contact portion toward the second contact electrode, and at least one second electrode extending portion protrudes from the second electrode contact portion toward the first contact electrode.

The first and second contact electrodes may respectively be substantially formed in a block letter "C" shape and in a reverse block letter "C" shape to engage with each other. The first and second electrode extending portions may each be formed substantially in a right angle extending toward the second and first contact electrodes, respectively.

The first contact electrode may be formed such that the first electrode extending portion extends substantially in a "T" shape formed from a central portion of the first electrode contact portion toward the second contact electrode.

The second contact electrode may be formed such that two second electrode extending portions extend substantially in right angles from end portions of the second electrode contact portion toward the first contact electrode, so that the two second electrode extending portions are arranged to embrace the first electrode extending portion.

BRIEF DESCRIPTION OF THE DRAWINGS

The above and/or other aspects, features and advantages of the present invention will become more apparent from the following detailed description when taken in conjunction with the accompanying drawings, in which.

DETAILED DESCRIPTION OF THE INVENTION

Figure 1:
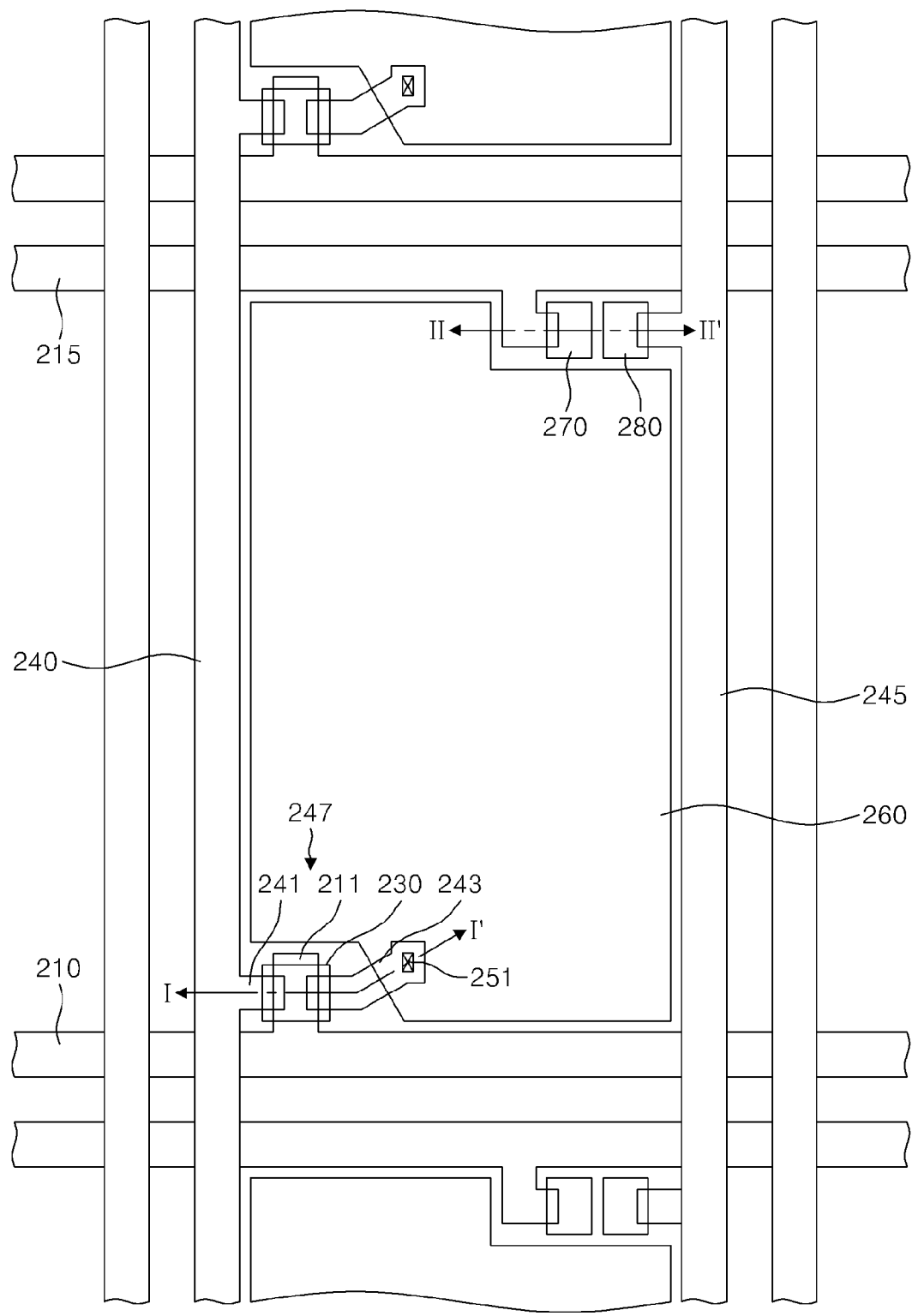
FIG. 1 is a plan view illustrating an exemplary liquid crystal display ("LCD") panel according to an exemplary embodiment of the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, when the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are described herein with reference to plan and cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

In a conventional liquid crystal display ("LCD") panel with an integrated touch screen panel, it is determined that there is a problem with touch sensitivity being low because the first and second touch conductive lines are formed at different heights. In addition, since the thin film transistor ("TFT") array substrate and the color filter array substrate may be misaligned when attached to each other, the first and second touch conductive lines and the touch spacer may shift a little bit from its normal locations. Also, the touch spacer may shift by a predetermined distance from its designed normal location when manufactured. In theses instances, the touch spacer may contact only one of the first and second touch conductive lines, so that there may occur an error in detecting coordinate values for a touch point.

Hereinafter, the present invention will be described in detail with reference to the accompanying drawings.

Figure 2:
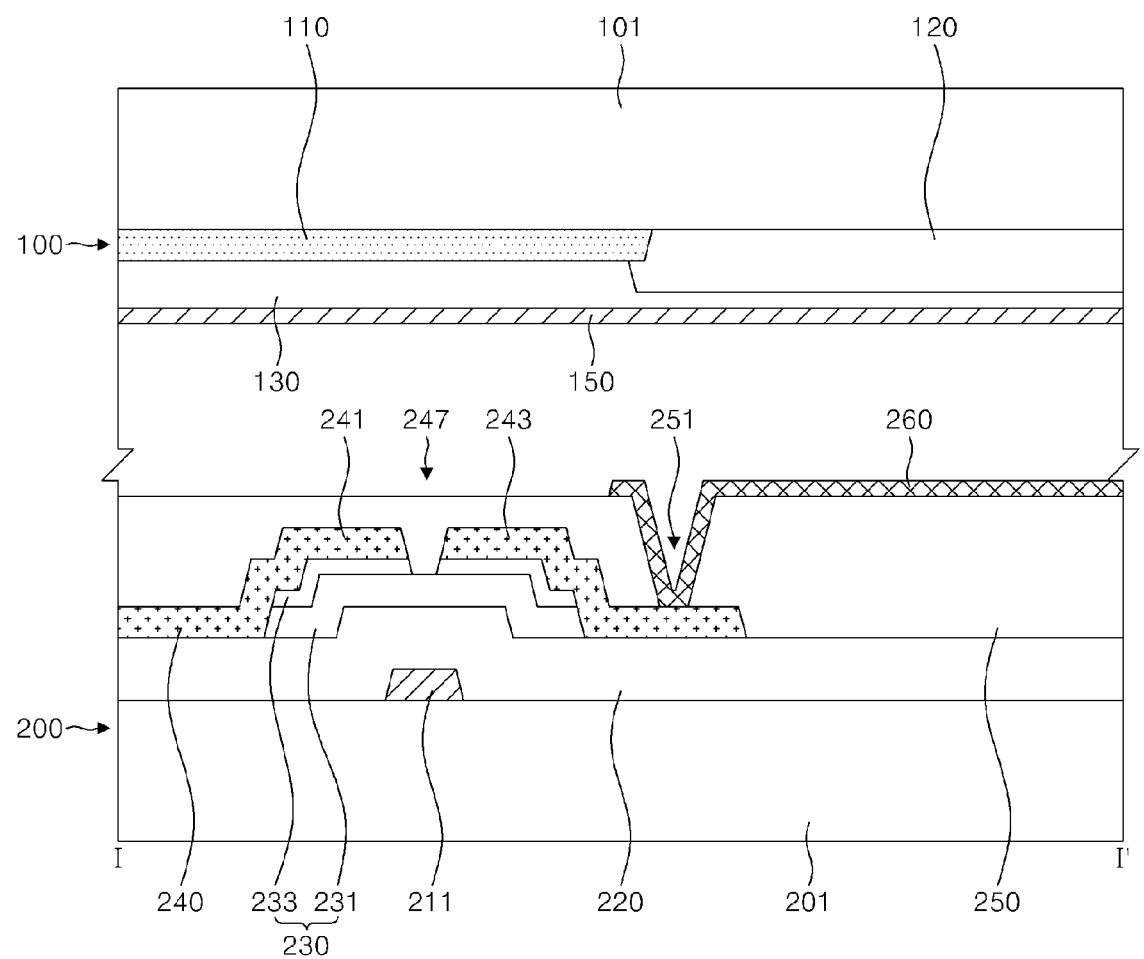
FIG. 2 is a cross-sectional view taken along line I-I' of FIG. 1.
Figure 3:
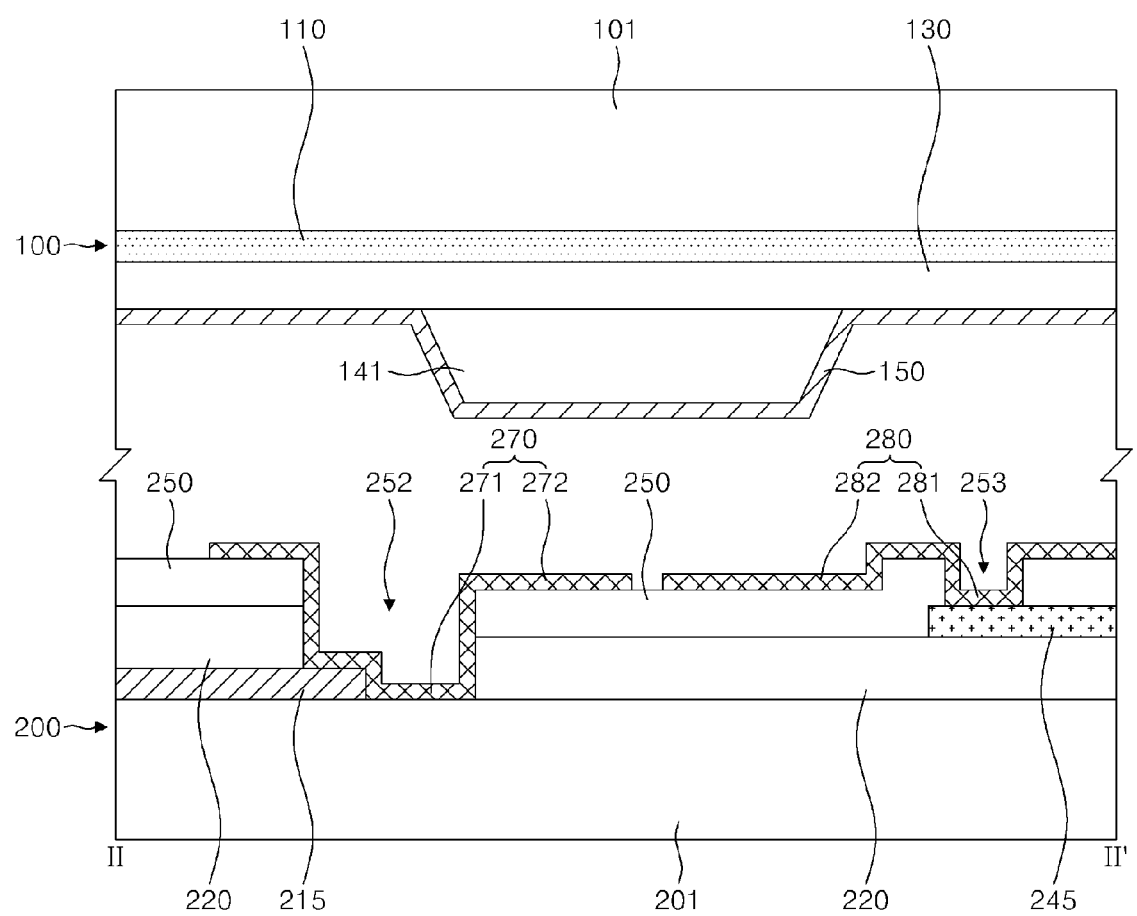
FIG. 3 is a cross-sectional view taken along line II-II' of FIG. 1.

FIG. 1 is a plan view illustrating an exemplary LCD panel according to an exemplary embodiment of the present invention, FIG. 2 is a cross-sectional view taken along line I-I' of FIG. 1, and FIG. 3 is a cross-sectional view taken along line II-II' of FIG. 1.

Referring to FIGS. 1 to 3, the exemplary LCD panel according to the exemplary embodiment of the present invention includes a first substrate 100 and a second substrate 200 with a liquid crystal layer interposed therebetween.

The first substrate 100 includes a black matrix 110 for preventing a light leakage, a color filter layer 120 for realizing a color image, an overcoat layer 130 for mitigating a step difference between the black matrix 110 and the color filter layer 120, and a common electrode 150 for applying a common voltage to the liquid crystal layer, and these elements are sequentially formed on an upper substrate 101.

The upper substrate 101 is made of a transparent insulating material such as plastic so that it can be smoothly pushed when a user touches its surface.

The black matrix 110 is formed to overlap a TFT 247, a gate line 210, a data line 240, and first and second touch conductive lines 215 and 245 which are formed in the second substrate 200 in order to prevent light from being emitted through regions where liquid crystal molecules can not be controlled. To this end, the black matrix 110 is made of an opaque organic material or an opaque metal.

The color filter layer 120 includes red R, green G and blue B color filters to realize various colors. The red R, green G and blue B color filters realize red, green and blue colors by absorbing and transmitting light of a certain wavelength through red, green and blue pigments contained therein, respectively. At this time, various colors can be realized by an additive color mixture of the red R, green G and blue B light which pass through the red R, green G and blue B color filters. The color filter layer 120 may partially overlap the black matrix 110.

The overcoat layer 130 is made of a transparent organic material for excellent step coverage and insulation of the common electrode 150. The overcoat layer 130 also serves to protect the color filter layer 120 and the black matrix 110.

The common electrode 150 is formed on the overcoat layer 130. The common electrode 150 is made of a transparent conductive metal such as indium tin oxide ("ITO") or indium zinc oxide ("IZO"). The common electrode 150 forms an electrical field for driving the liquid crystal layer together with a pixel electrode 260 by applying a common voltage to the liquid crystal layer as the pixel electrode 260 applies a pixel voltage to the liquid crystal layer. The common electrode 150, liquid crystal layer, and pixel electrode 260 form a liquid crystal capacitor of the LCD panel.

The first substrate 100 further includes a touch spacer 141 formed between the overcoat layer 130 and the common electrode 150. That is, the touch spacer 141 is formed on the overcoat layer 130 and is covered with the common electrode 150. The touch spacer 141 has a predetermined height, i.e., a convex shape to have the common electrode 150 contact first and second contact electrodes 270 and 280 of the second substrate 200 when a surface of the upper substrate 101 is touched by a user's finger or a stylus pen. A predetermined gap is maintained between the touch spacer 141 and the first and second contact electrodes 270 and 280 until a user touches a surface of the upper substrate 101. Also, when a user touches a surface of the upper substrate 101, the common electrode 150 on the touch spacer 141 contacts the first and second contact electrodes 270 and 280 so that the contact point can be detected.

In an exemplary embodiment, the touch spacer 141 may be made of a conductive material so that a voltage or an electrical current can be applied between the common electrode 150 and the first and second contact electrodes 270 and 280 when the common electrode 150 becomes damaged.

The second substrate 200 includes the gate line 210, the first touch conductive line 215, the data line 240, the second touch conductive line 245, the TFT 247, the pixel electrode 260, and the first and second contact electrodes 270 and 280 which are formed on a lower substrate 201.

The gate line 210 is formed on the lower substrate 201 in a first direction, e.g., a transverse direction. The gate line 210 may have a single-layer structure or a multi-layer structure made of molybdenum (Mo), niobium (Nb), copper (Cu), aluminum (Al), chromium (Cr), silver (Ag), tungsten (W), or their alloy, and/or combinations thereof. A gate electrode 211 extends from the gate line 210 adjacent a crossing point of the gate line 210 and the data line 240.

The first touch conductive line 215 is formed on the lower substrate 201 in the first direction parallel with the gate line 210 and is apart from the gate line 210. The first touch conductive line 215 may be made of the same material as the gate line 210, and within a same layer of the second substrate 200 as the gate line 210.

The data line 240 is formed in the lower substrate 201 in a second direction perpendicular or substantially perpendicular to the first direction, e.g., a vertical direction. The data line 240 crosses the gate line 210. The data line 240 may have a single-layer structure or a multi-layer structure made of Mo, Nb, Cu, Al, Cr, Ag, titanium (Ti), or their alloy, and/or of combinations thereof.

The second touch conductive line 245 is formed in the second direction parallel with the data line 240 and is apart from the data line 240. The second touch conductive line 245 may be made of the same material as the data line 240, and may be formed within a same layer of the second substrate 200 as the data line 240.

The TFT 247 performs a switching operation in response to a gate signal transmitted from the gate line 210 so that a pixel voltage signal of the data line 240 may be charged and maintained in the pixel electrode 260. To this end, the TFT 247 includes the gate electrode 211 extending from the gate line 210, a source electrode 241 extending from the data line 240, and a drain electrode 243 spaced apart from the source electrode 241 and electrically connected to the pixel electrode 260.

The TFT 247 further includes a gate insulating layer 220 and a semiconductor layer 230. The gate insulating layer 220 is formed over the whole surface of the lower substrate 201 to cover the gate electrode 211 as well as covering the gate line 210, the first touch conductive line 215, and other exposed surfaces of the lower substrate 201. The semiconductor layer 230 is formed on a portion of the gate insulating layer 220 above and overlapping the gate electrode 211 to form a channel between the source electrode 241 and the drain electrode 243.

The semiconductor layer 230 includes an active layer 231 and an ohmic contact layer 233. The active layer 231 is formed on the gate insulating layer 220 to have a channel between the source and drain electrodes 241 and 243, overlapping the gate electrode 211. The ohmic contact layer 233 is formed on the active layer 231 for ohmic contact with the data line 240 and the source and drain electrodes 241 and 243.

The second substrate 200 further includes a passivation film 250 formed over the whole surface of the lower substrate 201 while covering the TFT 247. The passivation film 250 is made of an inorganic insulating material, such as silicon nitride (SiNx) or silicon oxide (SiOx), or an organic insulating material, such as acrylic, polyimide or benzocyclobutene ("BCB"). The passivation film 250 may have a single-layer structure or a multi-layer structure made of an organic insulating material or/and an inorganic insulating material. The passivation film 250 is formed to cover the TFT 247, the data line 240, the second touch conductive line 245, and exposed portions of the gate insulating layer 220. The passivation film 250 insulates the TFT 247 from the pixel electrode 260.

The passivation film 250 has first to third contact holes 251 to 253 which expose a portion of the drain electrode 243 and portions of the first and second touch conductive lines 215 and 245, respectively. The first to third contact holes 251 to 253 may be formed by etching corresponding portions of the passivation film 250 through a mask process.

The pixel electrode 260 is formed on the passivation film 250. The pixel electrode 260 is electrically connected to the drain electrode 243 of the TFT 247 via the first contact hole 251. The pixel electrode 260 is made of a transparent conductive material such as ITO, IZO, indium tin zinc oxide ("ITZO"), or tin oxide ("TO").

Figure 4:
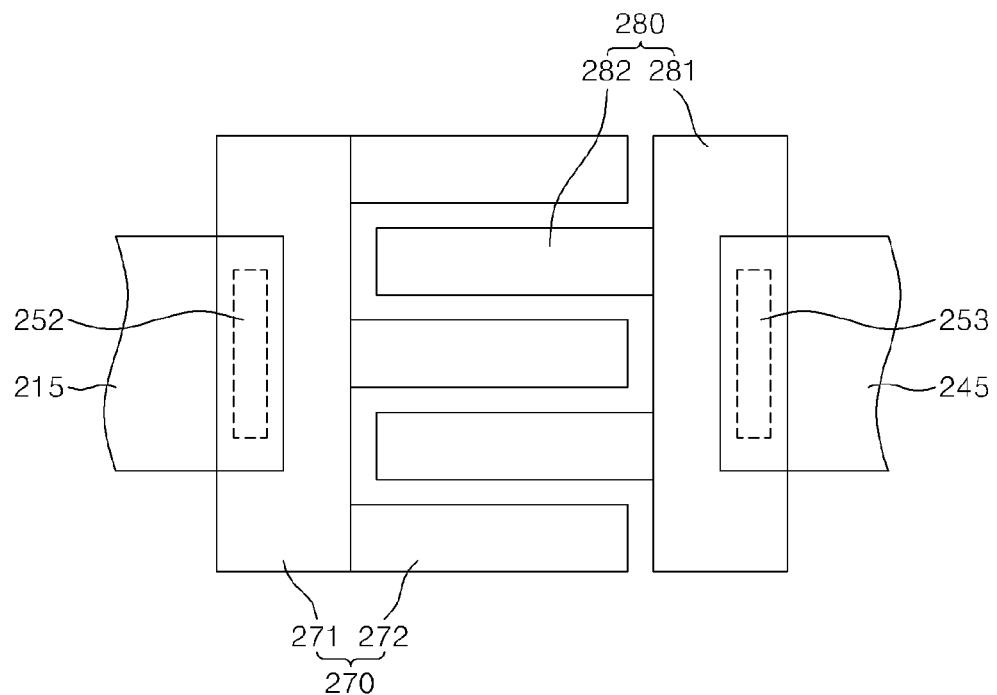
FIG. 4 is a plan view illustrating one example of exemplary first and second contact electrodes according to a first exemplary embodiment of the present invention.
Figure 5:
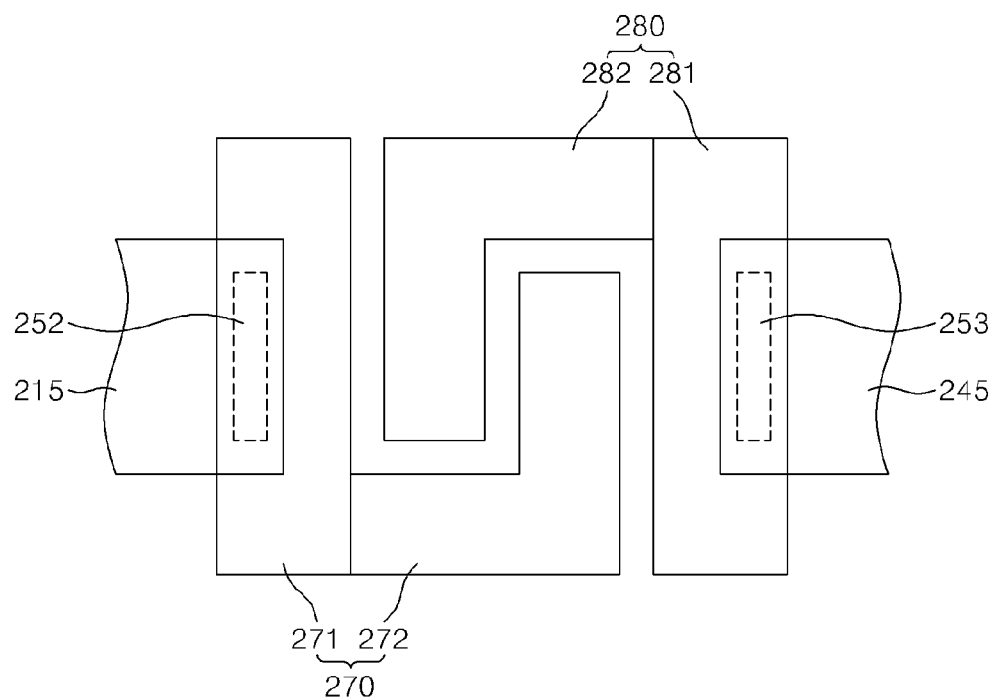
FIG. 5 is a plan view illustrating another example of the exemplary first and second contact electrodes according to a second exemplary embodiment of the present invention.
Figure 6:
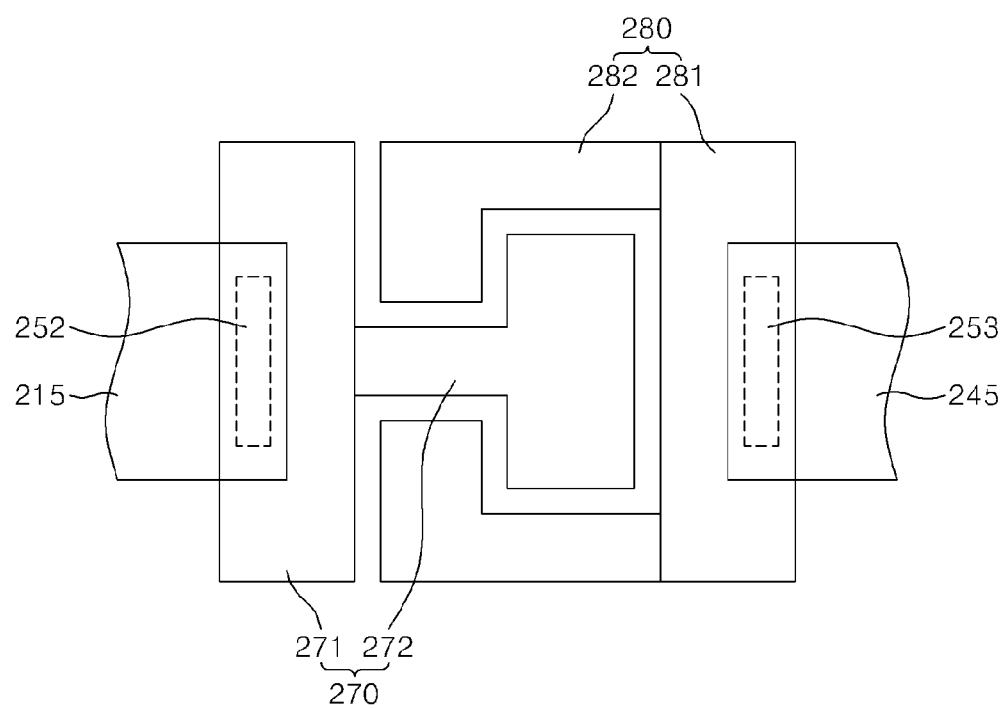
FIG. 6 is a plan view illustrating yet another example of the exemplary first and second contact electrodes according to a third exemplary embodiment of the present invention; and, FIGS. 7A to 17B are cross-sectional views illustrating an exemplary method for manufacturing the exemplary LCD panel according to an exemplary embodiment of the present invention.

The first contact electrode 270 and the second contact electrode 280 are also formed on the passivation film 250. The first contact electrode 270 includes a first electrode contact portion 271 which electrically contacts the first touch conductive line 215 and a first electrode extending portion 272 which extends from the first electrode contact portion 271. The second contact electrode 280 includes a second electrode contact portion 281 which electrically contacts the second touch conductive line 245 and a second electrode extending portion 282 which extends from the second electrode contact portion 281. The first and second electrode extending portions 272 and 282 may have various shapes, examples of which are shown in FIGS. 4, 5 and 6. The first and second electrode extending portions 272 and 282 may be alternately formed or symmetrically formed as if they engage each other.

The first electrode contact portion 271 of the first contact electrode 270 is electrically connected to the first touch conductive line 215 via the second contact hole 252 which penetrates the passivation film 250 and the gate insulating layer 220. The first electrode extending portion 272 of the first contact electrode 270 is formed on the passivation film 250 in a predetermined pattern form to face the second contact electrode 280.

The second electrode contact portion 281 of the second contact electrode 280 is electrically connected to the second touch conductive line 245 via the third contact hole 253 which penetrates the passivation film 250. The second electrode extending portion 282 of the second contact electrode 280 is formed on the passivation film 250 in a predetermined pattern form to face the first contact electrode 270. Here, the second electrode extending portion 282 is formed on the passivation film 250 at the same height as the first electrode extending portion 272 of the first contact electrode 270. In other words, the first electrode extending portion 272 and the second electrode extending portion 282 are substantially equidistant from the lower substrate 201. That is, portions of the first electrode extending portion 272 and the second electrode extending portion 282 that are overlapped by the touch spacer 141 are substantially coplanar with respect to each other. Therefore, when the LCD panel is touched, the touch spacer 141 equally contacts the first and second contact electrodes 270 and 280, whereby input sensitivity of a position touched by a user is improved.

In the LCD panel according to the exemplary embodiment of the present invention, when the upper substrate 101 is touched by a user's finger or a stylus pen, the first and second contact electrodes 270 and 280 contact through the touch spacer 141, so that a resistance value varies depending on a contact position. Since an electrical current or voltage depends on the varied resistance value, the detected electrical current or voltage is outputted as a horizontal coordinate signal through the first touch conductive line 215 and as a vertical coordinate signal through the second touch conductive line 245. The outputted coordinate signals are converted into coordinate values by a driving circuit, so that a command or an application program corresponding to the measured coordinate values is executed.

The first and second contact electrodes 270 and 280 may be patterned in various forms in order to prevent a coordinate value detecting error caused by a location shift of the touch spacer 141 that may occur as a result of manufacturing or prolonged use. Such a coordinating value detecting error may occur when the touch spacer 141 does not contact both of the first and second contact electrodes 270 and 280 due to a misalignment between the touch spacer 141 and the first and second contact electrodes 270 and 280. The coordinating value detecting error means that only one of the horizontal coordinate value and the vertical coordinate value is detected. According to the present invention, a structure of the first and second contact electrodes 270 and 280 prevents the coordinate value detecting error. Hereinafter, exemplary pattern forms of the first and second contact electrodes 270 and 280 are described below with reference to FIGS. 4 to 6.

FIG. 4 is a plan view illustrating one example of the exemplary first and second contact electrodes according to a first exemplary embodiment of the present invention.

As shown in FIG. 4, a first contact electrode 270 includes a first electrode contact portion 271 and at least one first electrode extending portion 272 which protrudes from the first electrode contact portion 271 in a stick form, and a second contact electrode 280 includes a second electrode contact portion 281 and at least one second electrode extending portion 282 which protrudes from the second electrode contact portion 281 in a stick form. Here, the first and second electrode extending portions 272 and 282 are alternately arranged as if they engage with each other. In other words, the first and second contact electrodes 270 and 280 include comb-shapes with teeth that mesh together, with the teeth of the first contact electrode 270 spaced from the teeth of the second contact electrode 280. In such an example, the first and second electrode extending portions 272 and 282 define the teeth of the meshed comb-shaped first and second contact electrodes 270 and 280.

In more detail, the first contact electrode 270 includes the first electrode contact portion 271 electrically connected to the first touch conductive line 215 via the second contact hole 252 and at least one first electrode extending portion 272 which extends from the first electrode contact portion 271 toward the second contact electrode 280. In a case where two or more first electrode extending portions 272 are formed, the two adjacent first electrode extending portions 272 are spaced apart from each other, and the first electrode extending portions 272 of the first contact electrode 270 are formed in a concave-convex form.

The second contact electrode 280 includes the second electrode contact portion 281 electrically connected to the second touch conductive line 245 via the third contact hole 253 and at least one second electrode extending portion 282 which extends from the second electrode contact portion 281 toward the first contact electrode 270. In a case where two or more second electrode extending portions 282 are formed, the two adjacent second electrode extending portions 282 are spaced apart from each other, and the second electrode extending portions 282 of the second contact electrode 280 are formed in a concave-convex form.

The first and second electrode extending portions 272 and 282 are alternately arranged between the first and second contact electrodes 270 and 280. For example, the first and second electrode extending portions 272 and 282 may be formed such that n-1 second electrode extending portions 282 are fitted into and alternately arranged between n first electrode extending portions 272. Here, n is a natural number more than 1. For the first and second contact electrodes 270 and 280 having such a structure, even if the touch spacer 141 deviates from its normal location, the first and second contact electrodes 270 and 280 can equally contact the touch spacer 141.

The pattern form of the first and second contact electrodes 270 and 280 is not limited to that of FIG. 4 or the above described exemplary embodiment. For example, the first and second contact electrodes 270 and 280 may have n first electrode extending portions 272 and n second electrode extending portion 282, respectively, or n first electrode extending portions 272 and n+1 second electrode extending portion 282, respectively. Here, n is a natural number. That is, the first contact electrode 270 may have more first electrode extending portions 272 than the second contact electrode 280 has second electrode extending portions 282, or vice versa. Also, the first and second electrode extending portions 272, 282 may be equal in number to each other.

FIG. 5 is a plan view illustrating another example of the exemplary first and second contact electrodes according to a second exemplary embodiment of the present invention.

As shown in FIG. 5, a first contact electrode 270 may be formed in a block-letter "C" shape counterclockwise rotated at 90°, and a second contact electrode 280 may be formed in a block-letter "C" shape clockwise rotated at 90°. In other words, the shapes may be formed in reverse forms. A block-letter "C" shape may substantially have the shape of a rectangle with one side removed, and in this case the remaining parallel or substantially parallel sides may have differing lengths. In an exemplary embodiment, the first contact electrode 270 may be formed in a form of "⌐"counterclockwise rotated at 90°, and a second contact electrode 280 may be formed in a reverse form of a "⌐"clockwise rotated at 90°.

In more detail, the first contact electrode 270 includes a first electrode contact portion 271 electrically connected to the first touch conductive line 215 via the second contact hole 252 and a first electrode extending portion 272 which extends in an "L" shape counterclockwise rotated at 90° from one side edge of the first electrode contact portion 271 toward the second contact electrode 280. Therefore, the first contact electrode 270 has a block-letter "C" shape counterclockwise rotated at 90°. That is, the first contact electrode 270 has the first electrode contact portion 271, a first portion of the first electrode extending portion 272 extending angularly, such as substantially perpendicularly, from a first end portion of the first electrode contact portion 271, and a second portion of the first electrode extending portion 272 extending angularly, such as substantially perpendicularly, from the first portion of the first electrode extending portion 272, such that the second portion of the first electrode extending portion 272 may extend substantially parallel to the first electrode contact portion 271. Also, a length of the second portion of the first electrode extending portion 272 may be shorter than a length of the first electrode contact portion 271.

The second contact electrode 280 includes a second electrode contact portion 281 electrically connected to the second touch conductive line 245 via the third contact hole 253 and a second electrode extending portion 282 which extends in an "L" shape clockwise rotated at 90° from one side edge of the second electrode contact portion 281 toward the first contact electrode 270. Therefore, the second contact electrode 280 has a block letter "C" shape clockwise rotated at 90°. In an exemplary embodiment, the second contact electrode 280 may have a reverse shape of a letter "U" or a reverse shape of a Korean letter "ㄷ"counter clockwise rotated at 90°. That is, the second contact electrode 280 has the second electrode contact portion 281, a first portion of the second electrode extending portion 282 extending angularly, such as substantially perpendicularly, from a first end portion of the second electrode contact portion 281, and a second portion of the second electrode extending portion 282 extending angularly, such as substantially perpendicularly, from the first portion of the second electrode extending portion 282, such that the second portion of the second electrode extending portion 282 may extend substantially parallel to the second electrode contact portion 281. Also, a length of the second portion of the second electrode extending portion 282 may be shorter than a length of the second electrode contact portion 281.

The first and second contact electrodes 270 and 280 are symmetrically formed as if the first and second electrode extending portions 272 and 282 engage with each other. In other words, the second portion of the first electrode extending portion 272 is nested within or surrounded by the second contact electrode 280, and the second portion of the second electrode extending portion 282 is nested within or surrounded by the first contact electrode 270. Corresponding portions of the first and second extending portions 272 and 282 may be arranged in parallel with each other and symmetric to each other. Therefore, even if the touch spacer 141 shifts or deviates from its normal location, the first and second contact electrodes 270 and 280 can equally contact the touch spacer 141.

FIG. 6 is a plan view illustrating a third example of the exemplary first and second contact electrodes according to a third exemplary embodiment of the present invention.

As shown in FIG. 6, a first contact electrode 270 includes a first electrode contact portion 271 electrically connected to the first touch conductive line 215 via the second contact hole 252 and a first electrode extending portion 272 which extends substantially in a laid "T" shape from a central portion of the first electrode contact portion 271 toward the second contact electrode 280. In other words, the first electrode extending portion 272 includes a first portion extending angularly, such as substantially perpendicularly, from a central portion of the first electrode contact portion 271, and a second portion arranged angularly, such as substantially perpendicularly, with respect to an end portion of the first portion of the first electrode extending portion 272, such that the first portion of the first electrode extending portion 272 abuts with a central portion of the second portion of the first electrode extending portion 272.

A second contact electrode 280 includes a second electrode contact portion 281 electrically connected to the second touch conductive line 245 via the third contact hole 253 and two second electrode extending portions 282. One of the two second electrode extending portion 282 extends substantially in an L-shape rotated 90° clockwise from one side edge of the second electrode contact portion 281 toward the first contact electrode 270, whereas the other of the two second electrode extending portions 282 extends substantially in a mirror image of an L-shape rotated 90° clockwise from the other side edge of the second electrode contact portion 281 toward the first contact electrode 270. In other words, the "L" shape forms of the second electrode extending portions 282 may be reverse forms from each other. That is, the second contact electrode 280 includes the second electrode contact portion 281 having a first end portion and a second end portion, a first second electrode extending portion 282 extending from the first end portion of the second electrode contact portion 281, and a second electrode extending portion 282 extending from the second end portion of the second electrode contact portion 281. The first second electrode extending portion 282 includes a first portion extending angularly, such as perpendicularly, from the first end portion of the second electrode contact portion 281, and a second portion extending angularly, such as perpendicularly, from the first portion of the first second electrode extending portion 282. The second electrode extending portion 282 includes a first portion extending angularly, such as perpendicularly, from the second end portion of the second electrode contact portion 281, and a second portion extending angularly, such as perpendicularly, from the first portion of the second second electrode extending portion 282. The second portion of the first second electrode extending portion 282 and the second portion of the second second electrode extending portion 282 may each extend towards the first portion of the first electrode extending portion 272, and may each extend substantially parallel to the second portion of the first electrode extending portion 272. Therefore, the second electrode extending portions 282 are symmetrically formed in a form for embracing and surrounding the first electrode extending portion 272.

As described above, the first and second contact electrodes 270 and 280 are formed to engage with each other in a contact region, so that the first and second contact electrodes 270 and 280 can equally contact the touch spacer 141 even if the touch spacer 141 deviates from its normal location. In the contact region, the first and second electrode extending portions 272 and 282 may mesh with each other and at least one may partially surround the other while maintaining a gap therebetween. While particular exemplary embodiments have been described, it should be understood that alternative exemplary embodiments of the first and second electrode extending portions 272 and 282 would also be within the scope of these inventions. For example, the first and second electrode extending portions 272 and 282 may have opposite forms to each other. That is, the pattern form of the second electrode extending portion 282 may be applied to the first contact electrode 270 and the pattern form of the first electrode extending portion 272 may be applied to the second contact electrode 280.

An exemplary method for manufacturing the exemplary LCD panel according to an exemplary embodiment of the present invention is described below with reference to FIGS. 7A to 17B.

FIGS. 7A to 17B are cross-sectional views illustrating an exemplary method for manufacturing the exemplary LCD panel according to an exemplary embodiment of the present invention. In FIGS. 7A to 17B, lines I-I' and II-II' refer to the lines I-I' and II-II' of FIG. 1.

Referring to FIGS. 7A to 17B, the exemplary method for manufacturing the exemplary LCD panel according to the exemplary embodiment of the present invention includes forming a first substrate 100 (i.e., color filter array substrate) and forming a second substrate 200 (i.e., TFT array substrate).

Forming the first substrate 100 is described below in detail with reference to FIGS. 7A to 11B.

Figure 7A:
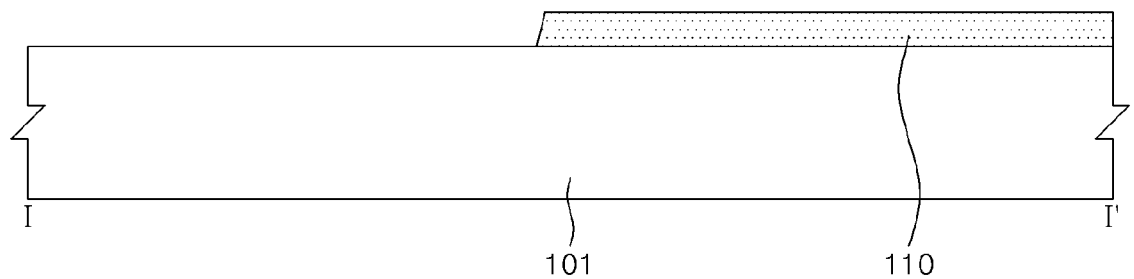
Figure 7B:
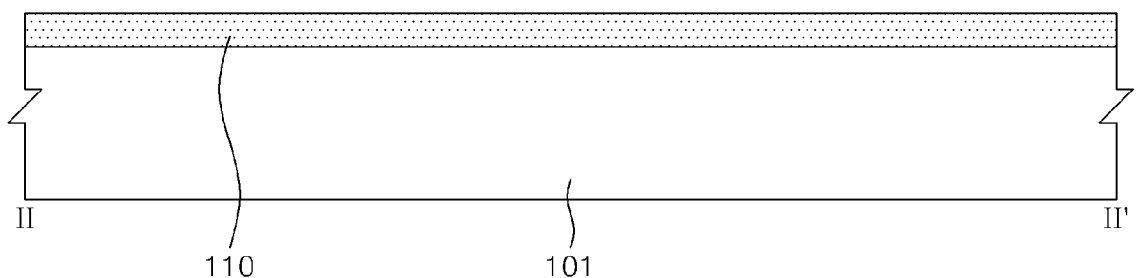

First, as shown in FIGS. 7A and 7B, a black matrix 110 is formed on an upper substrate 101.

The black matrix 110 is formed such that an opaque organic material layer or an opaque metal layer is deposited on the upper substrate 101 and is patterned such as by a photolithography process and an etching process. The black matrix 110 is formed at the predetermined width to prevent opaque metal patterns of the second substrate 200 from being visible. In other words, the black matrix 110 is formed such that in an assembled LCD panel, the black matrix 110 will overlap with opaque metal patterns of the second substrate 200. The upper substrate 101 is made of a transparent insulating material such as plastic so that it can be smoothly pushed when its surface is touched.

Figure 8:
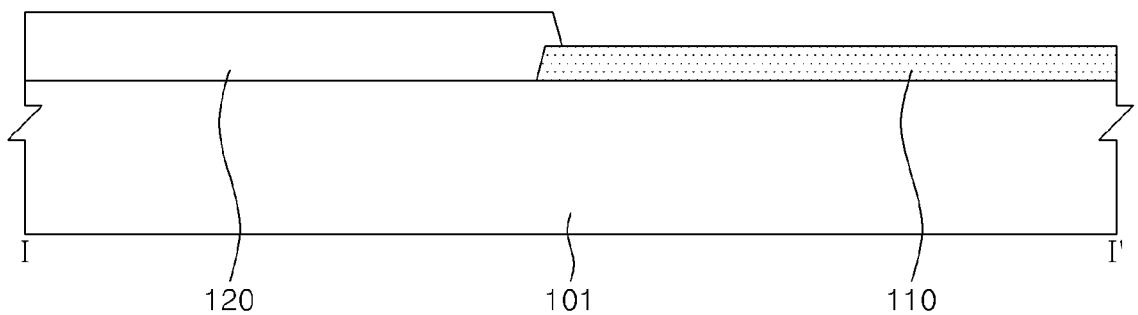

A color filter layer 120 is formed on the upper substrate 101 having the black matrix 110 as shown in FIG. 8. The color filter layer 120 may be formed such that red R, green G and blue B color filters are sequentially formed by a photolithography method. The color filters may be also be formed by an ink jet method. The color filter layer 120 may partially overlap the black matrix 110.

Figure 9A:
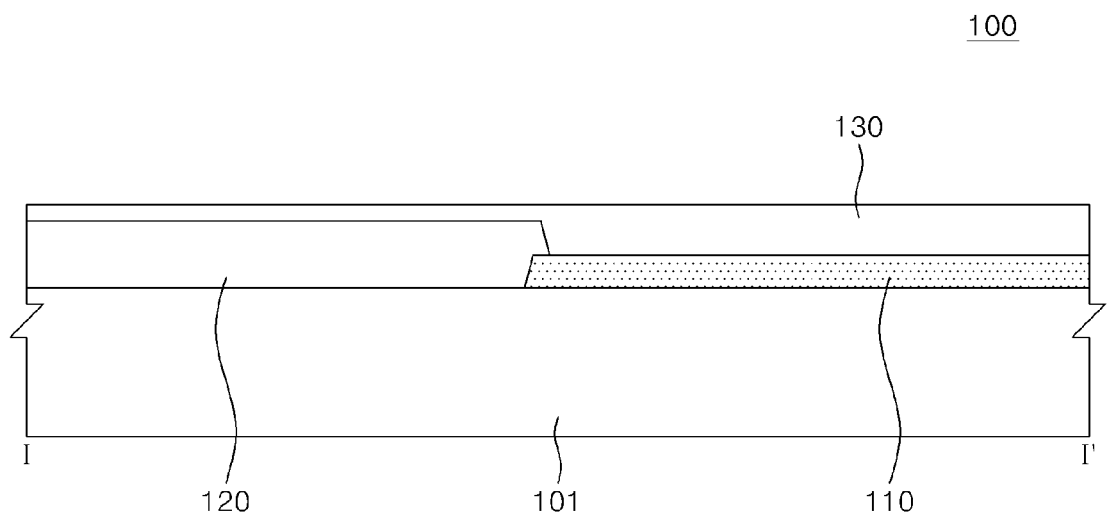
Figure 9B:
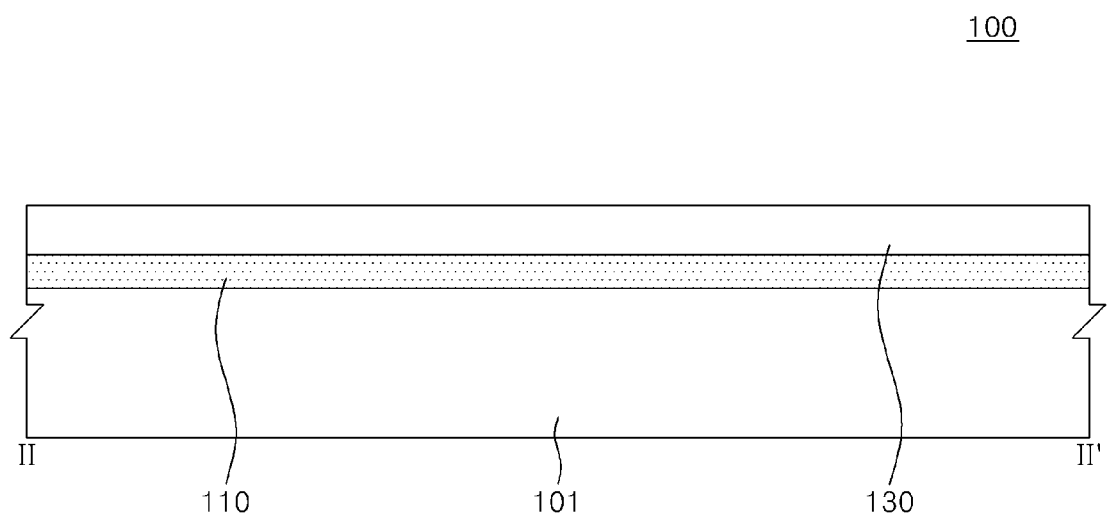

Next, as shown in FIGS. 9A and 9B, an overcoat layer 130 is formed over the whole surface of the upper substrate 101 to cover the black matrix 110 and the color filter layer 120.

The overcoat layer 130 is formed at a predetermined thickness to protect the color filter layer 120 and to obtain excellent step coverage for when a common electrode 150 is formed. The overcoat layer 130 may be formed by depositing acrylic resin using, for example, a spin coating technique.

Figure 10:
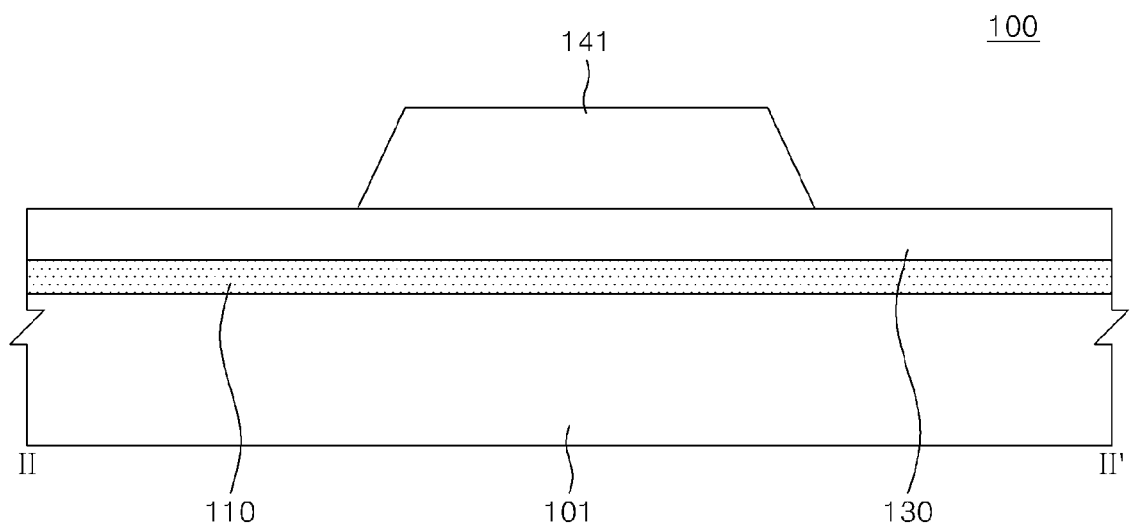

Then, as shown in FIG. 10, a touch spacer 141 is formed on the overcoat layer 130 such as by using a conductive polymer.

In order to form the touch spacer 141, a conductive polymer layer may be deposited over the whole surface of the upper substrate 101. A photoresist is coated on the conductive polymer layer and subjected to a light exposure process and a development process of a photolithography process to thereby form a photoresist pattern. The conductive polymer layer may then be patterned by an etching process using the photoresist pattern as a mask, thereby forming the touch spacer 141. The conductive polymer layer may alternatively be formed by using an inkjet printing technique.

Figure 11A:
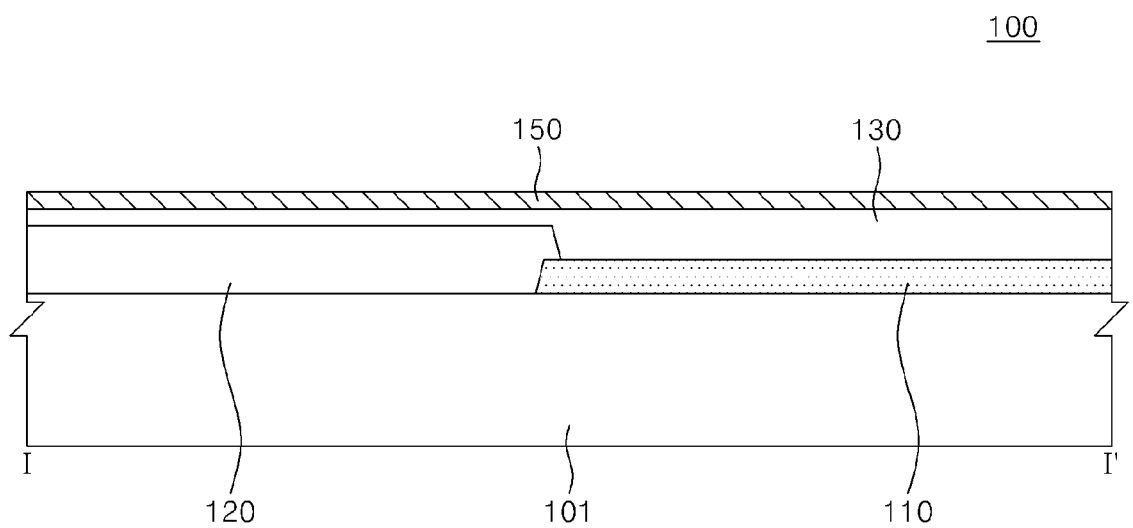
Figure 11B:
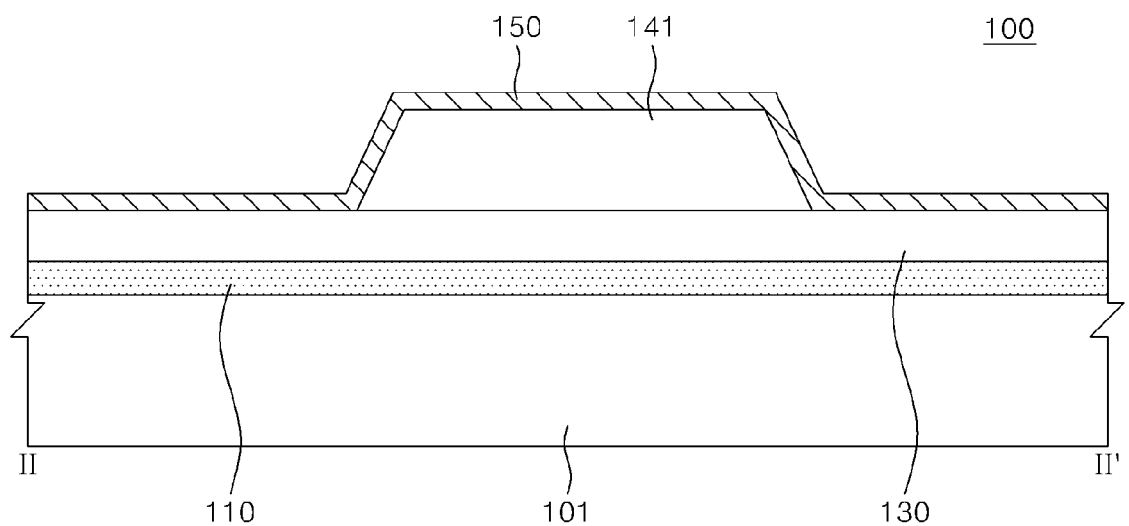

Subsequently, as shown in FIGS. 11A and 11B, the common electrode 150 is formed over the whole surface of the upper substrate 101 to cover the overcoat layer 130 and the touch spacer 141.

In more detail, a transparent conductive material layer is deposited over the whole surface of the upper substrate 101 to cover the overcoat layer 130 and the touch spacer 141 by using, for example, a sputtering technique. The transparent conductive material layer is made of a transparent conductive material such as ITO or IZO. The transparent conductive material layer may be patterned into the common electrode 150 by a photolithography process and an etching process using a mask.

Forming the second substrate 200 is described below in detail with reference to FIGS. 12A to 17B.

Figure 12A:
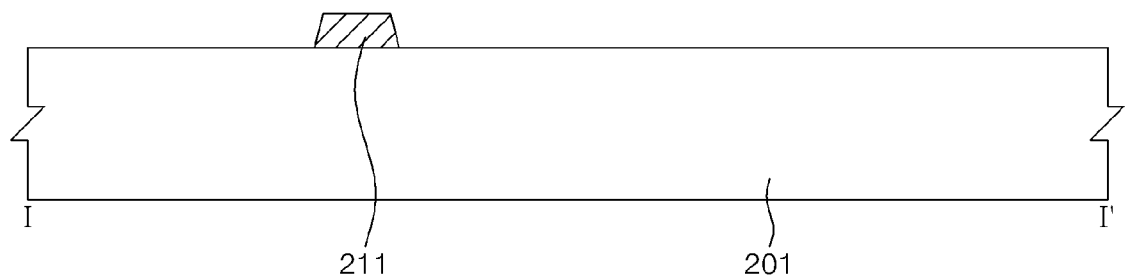
Figure 12B:
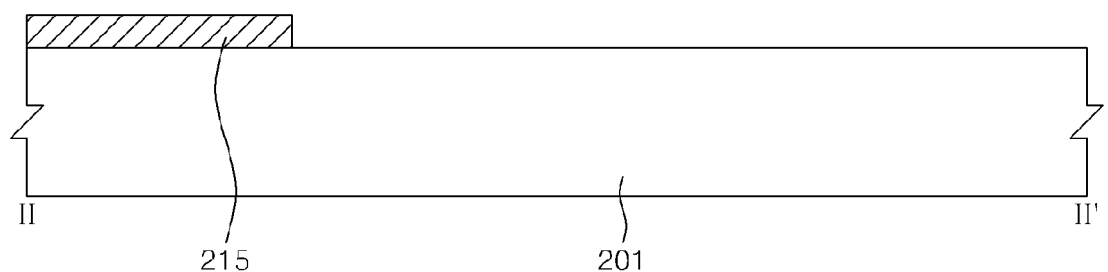

First, as shown in FIGS. 12A and 12B, a gate metal pattern having a gate line 210, a gate electrode 211 and a first touch conductive line 215 is formed on a lower substrate 201. The gate metal pattern may be formed by depositing a gate metal layer by a deposition technique such as a sputtering technique and then patterning the gate metal layer by a photolithography process and an etching process. The lower substrate 210 is made of a transparent insulating material such as glass or plastic.

The gate line 210 is formed in a first direction, and the gate electrode 211 extends from the gate line 210. The first touch conductive line 215 is formed in the first direction parallel with the gate line 210. The first touch conductive line 215 is spaced apart from the gate line 210. For example, the first touch conductive line 215 is at a distance of about 5 μm from the gate line 210.

Figure 13A:
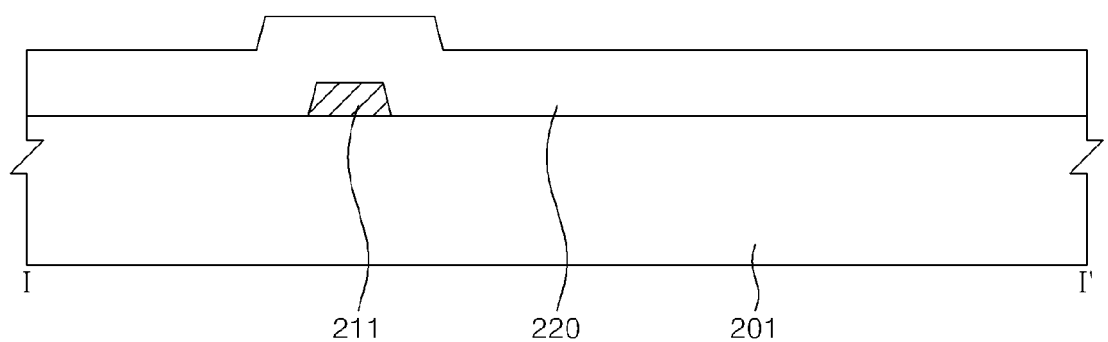
Figure 13B:
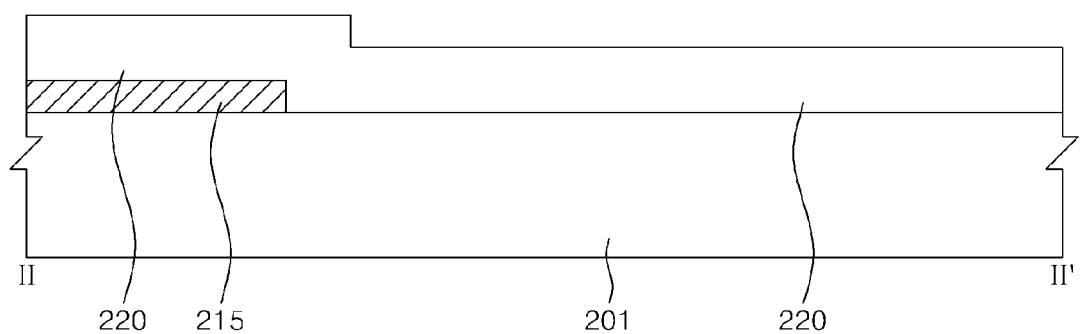

Then, as shown in FIGS. 13A and 13B, a gate insulating layer 220 is formed over the whole surface of the lower substrate 201 having the gate metal pattern, such as by using a plasma enhanced chemical vapor deposition ("PECVD") technique. The gate insulating layer 220 is formed by depositing an insulating material such as silicon nitride (SiNx) or silicon oxide (SiOx) over the whole surface of the lower substrate 201. The gate insulating layer 220 is formed to cover the gate metal pattern formed on the lower substrate 201, thereby electrically insulating the gate metal pattern.

Figure 14:
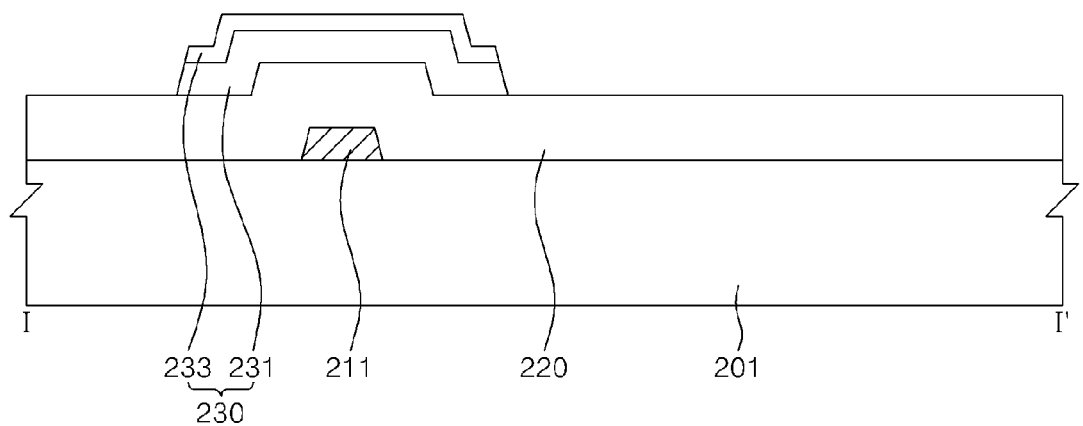

As shown in FIG. 14, a semiconductor layer 230 includes an active layer 231 and an ohmic contact layer 233 formed on a portion of the gate insulating layer 220 over the gate electrode 211 so as to overlap the gate electrode 211. The active layer 231 is formed such that a polysilicon layer or an amorphous silicon ("a-Si") layer is deposited and patterned such as by a photolithography process and an etching process, and the ohmic contact layer 233 is formed such that a doped polysilicon layer or a doped a-Si layer is deposited and patterned such as by a photolithography process and an etching process.

Figure 15A:
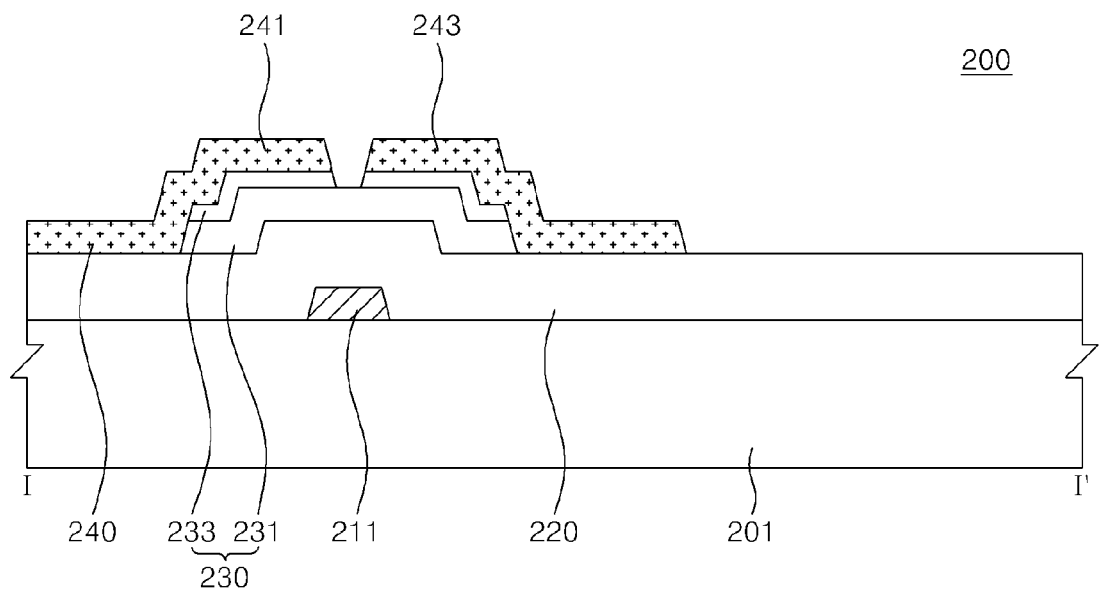
Figure 15B:
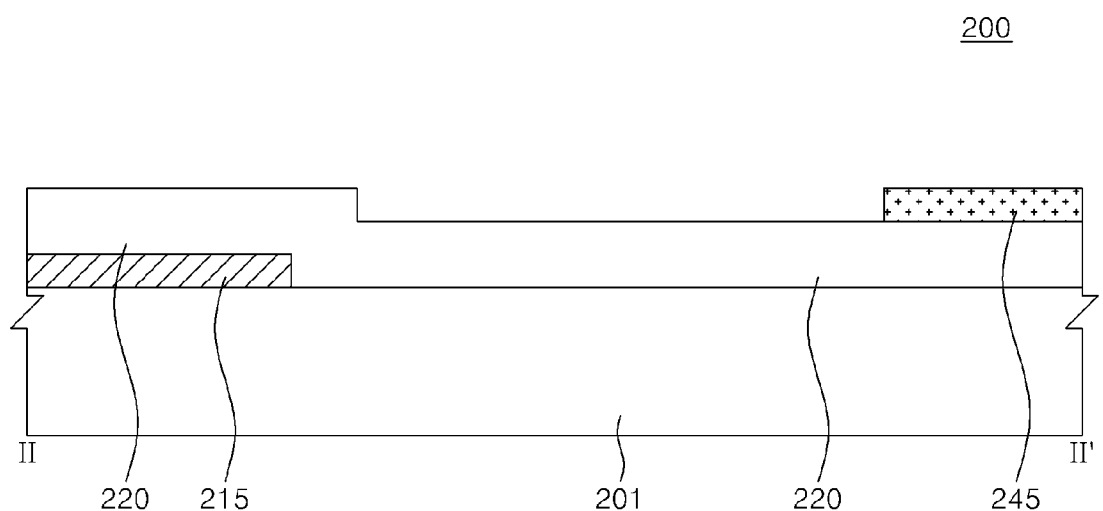

Subsequently, as shown in FIGS. 15A and 15B, a data metal pattern having a data line 240, a source electrode 241, a drain electrode 243, and a second touch conductive line 245 is formed on the lower substrate 201 having the semiconductor layer 230.

In more detail, the data metal pattern is formed such that a metal layer is deposited on the lower substrate 201 having the semiconductor layer 230 and the gate insulating layer 220 and patterned such as by a photolithography process and an etching process.

The data line 240 is formed to cross the gate line 210. The source electrode 241 may be formed to have a "U" shape which surrounds the drain electrode 243, and is apart from the drain electrode 243. One side of the drain electrode 243 faces the source electrode 241, and the other side is electrically connected to the pixel electrode 260. The side of the drain electrode 243 connected to the pixel electrode 260 may have a wider area size than the side of the drain electrode 243 facing the source electrode 241, as shown in FIG. 1.

Figure 16A:
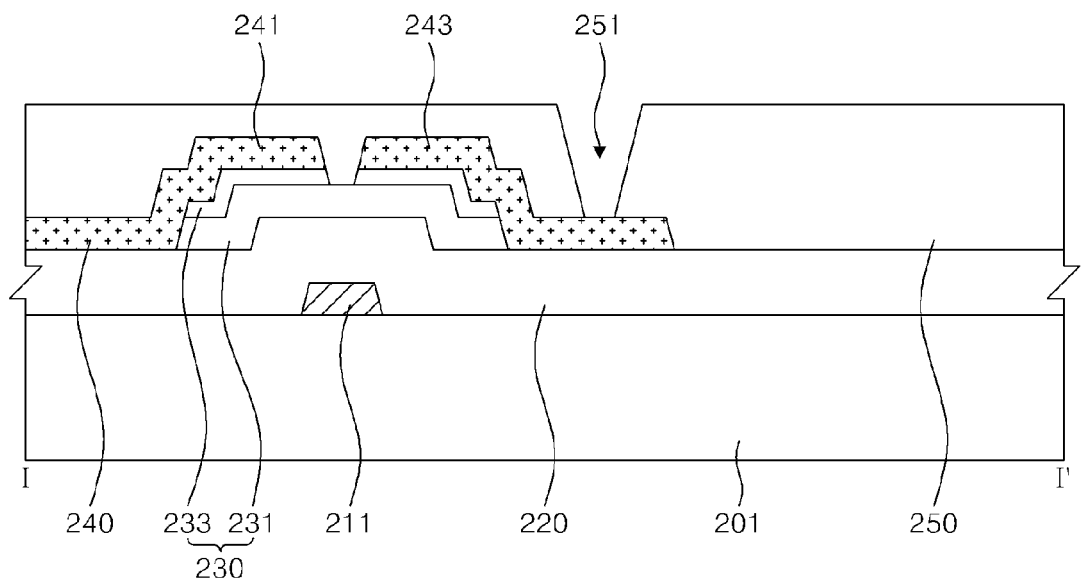
Figure 16B:
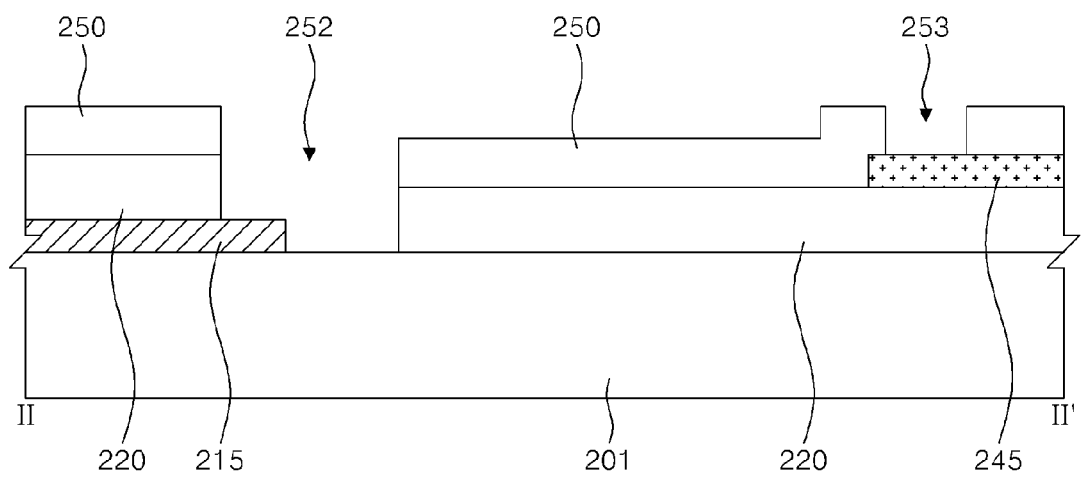

As shown in FIGS. 16A and 16B, a passivation film 250 is formed over the whole surface of the lower substrate 201. First to third contact holes 251 to 253 are formed in the passivation film 250.

The passivation film 250 is formed over the whole surface of the lower substrate 201 such as by using a deposition technique such as a PECVD technique or a spin coating technique. The first and third contact holes 251 and 253 may be formed by a photolithography process and an etching process using a mask to penetrate the passivation film 250. At the same time, the second contact hole is formed to penetrate the passivation film 250 and the gate insulating layer 220. The first contact hole 251 exposes a portion of the drain electrode 243, the third contact hole 253 exposes a portion of the second touch conductive line 245, and the second contact hole 252 exposes a portion of the first touch conductive line 215. The second contact hole 252 may further expose a portion of the lower substrate 201 adjacent to the first touch conductive line 215. The passivation film 250 may be formed of an inorganic insulating material such as silicon nitride (SiNx) or silicon oxide (SiOx) or an organic insulating material such as acrylic, polyimide or benzocyclobutene ("BCB").

Figure 17A:
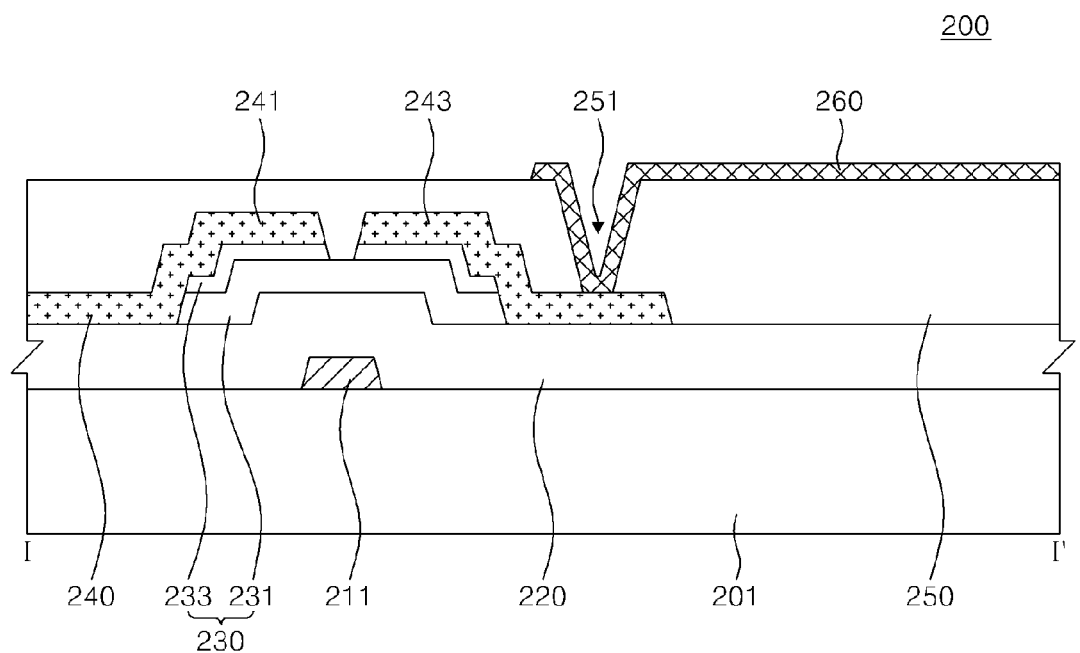
Figure 17B:
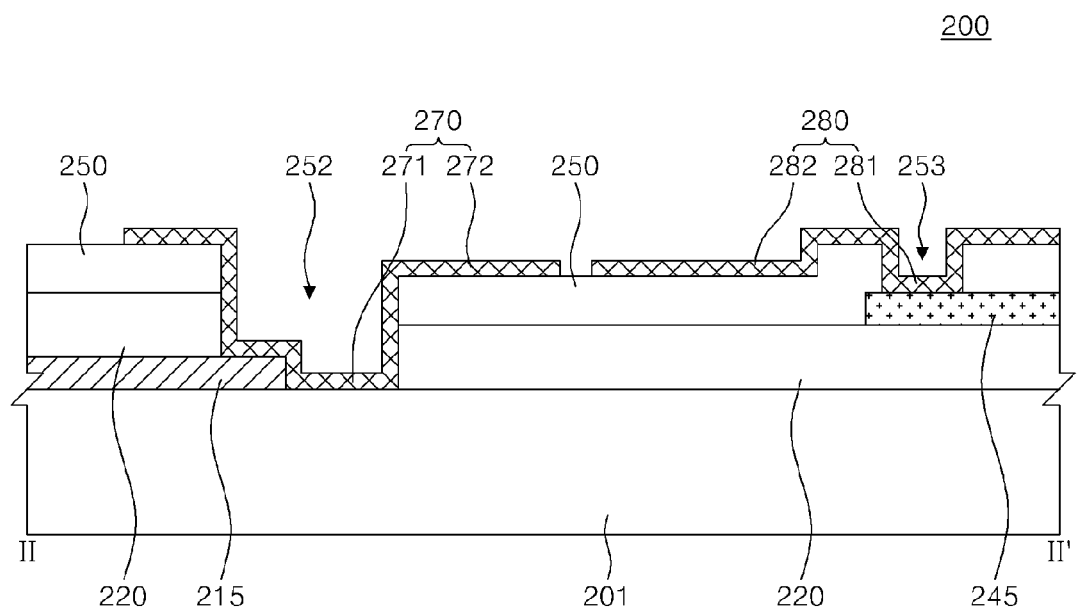

Thereafter, as shown in FIGS. 17A and 17B, a pixel electrode 260 and first and second contact electrodes 270 and 280 are formed on the passivation film 250.

More specifically, a transparent conductive material layer such as ITO, IZO or TO is deposited on the passivation film 250 by using a deposition technique such as a sputtering technique and then patterned by a photolithography process and an etching process using a mask, thereby forming the pixel electrode 260 in a pixel region.

The first and second contact electrodes 270 and 280 are formed on the passivation film 250 at the same height, at least within a contact region of the second substrate 200. In other words, the first and second contact electrodes 270 and 280 are substantially coplanar within the contact region. The first and second contact electrodes 270 and 280 are electrically connected to the first and second touch conductive lines 215 and 245 via the second and third contact holes 252 and 253, respectively. The first contact electrode 270 includes a first electrode contact portion 271 electrically connected to the first touch conductive line 215 via the second contact hole 252 and a first electrode extending portion 272 extending toward the second contact electrode 280. The second contact electrode 280 includes a second electrode contact portion 281 electrically connected to the second touch conductive line 245 via the third contact hole 253 and a second electrode extending portion 282 extending toward the first contact electrode 270. The first and second electrode extending portions 272 and 282 may have many adjacent surfaces to each other. A plurality of first and second electrode extending portions 272 and 282 may be formed. In exemplary embodiments, the first and second electrode extending portions 272 and 282 are alternately or symmetrically formed as if they engage each other. The first and second contact electrodes 270 and 280 may be formed such that there are more first electrode extending portions 272 than second electrode extending portions 282 or vice versa. Alternatively, the first and second contact electrodes 270 and 280 may be formed such the first electrode extending portion 272 is equal in number to the second electrode extending portion 282. The first and second electrode extending portions 272 and 282 are formed on the passivation film 250 at the same height with respect to a surface of the lower substrate 201 and substantially coplanar with respect to each other. In other words, a thickness of the second substrate 200 measured from the lower substrate 201 to the first electrode extending portion 272 is substantially the same as a thickness of the second substrate 200 measured from the lower substrate 201 to the second electrode extending portion 282 within the contact region.

The first and second contact electrodes 270 and 280 may be formed in a predetermined pattern form, as previously shown and described with respect to FIGS. 4 to 6.

As described above, according to the present invention, since the first and second contact electrodes are formed at the same height, the input sensitivity of the contact position is improved, whereby horizontal and vertical coordinate values can be accurately detected. Also, due to the efficient structures of the first and second contact electrodes, the touch spacer equally contacts the first and second contact electrodes even if the touch spacer shifts or deviates from its normal location, thereby preventing the coordinate value detecting error.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A liquid crystal display panel, comprising:
a touch spacer formed in a first substrate;
a common electrode formed to cover the touch spacer;
a first touch conductive line formed in a first direction in a second substrate opposite to the first substrate;
a second touch conductive line formed in a second direction substantially perpendicular to the first touch conductive line; and
first and second contact electrodes respectively electrically connected to the first and second touch conductive lines, portions of the first and second contact electrodes formed at a same height within the second substrate, wherein the portions of the first and second contact electrodes contact the common electrode by the touch spacer in a contact position, and wherein a plurality of first edges defining the portion of the first contact electrode face a plurality of second edges defining the portion of the second contact electrode,
wherein at least two of the first edges extend in different directions and are substantially parallel to corresponding at least two of the second edges,
wherein the second substrate comprises:
a gate line formed substantially in parallel with the first touch conductive line;
a gate insulating layer formed to cover the first touch conductive line and the gate line;
a data line formed on the gate insulating layer substantially in parallel with the second touch conductive line;
a passivation film formed to cover the data line and having a first contact hole which exposes a portion of the data line; and
a pixel electrode formed on the passivation film to be electrically connected to the data line,
wherein the first and second touch conductive lines are formed at a same level as the gate line and the data line, respectively, so that a step difference exists between the first and second touch conductive lines,
wherein the first contact electrode is formed on the passivation film and is electrically connected to the first touch conductive line via a second contact hole which penetrates the passivation film and the gate insulating layer, and the second contact electrode is formed on the passivation film and is electrically connected to the second touch conductive line via a third contact hole,
wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions are alternately arranged.

2. The liquid crystal display panel of claim 1, wherein the first and second electrode extending portions are formed at the same height within the second substrate by the gate insulating layer and the passivation film.

3. The liquid crystal display panel of claim 2, wherein the first electrode extending portion includes one or more first electrode extending portions and the second electrode extending portion includes one or more second electrode extending portions.

4. The liquid crystal display panel of claim 3, wherein the first and second contact electrodes are formed such that at least one first electrode extending portion protrudes from the first electrode contact portion toward the second contact electrode, and at least one second electrode extending portion protrudes from the second electrode contact portion toward the first contact electrode.

5. The liquid crystal display panel of claim 4, wherein the first and second contact electrodes are respectively substantially formed in a block letter "C" shape and in a reverse block letter "C" shape to engage with each other.

6. The liquid crystal display panel of claim 5, wherein the first and second electrode extending portions are each formed substantially in a right angle extending toward the second and first contact electrodes, respectively.

7. The liquid crystal display panel of claim 3, wherein the first contact electrode is formed such that the first electrode extending portion extends substantially in a "T" shape formed from a central portion of the first electrode contact portion toward the second contact electrode.

8. The liquid crystal display panel of claim 7, wherein the second contact electrode is formed such that two second electrode extending portions extend substantially in right angles from end portions of the second electrode contact portion toward the first contact electrode, so that the two second electrode extending portions are arranged to embrace the first electrode extending portion.

9. A method for manufacturing a liquid crystal display panel, the method comprising:
forming a touch spacer in a first substrate;
forming a common electrode to cover the touch spacer;
forming a gate metal pattern having a gate line, a gate electrode, and a first touch conductive line in a second substrate opposite to the first substrate;
forming a gate insulating layer to cover the gate metal pattern;
forming a semiconductor layer on a portion of the gate insulating layer over the gate electrode;
forming a data metal pattern having a data line, a source electrode, a drain electrode, and a second touch conductive line over the gate metal pattern;
forming a passivation film to cover the data metal pattern, the passivation film having first to third contact holes which expose a portion of the drain electrode and portions of the first and second touch conductive lines, respectively; and
forming portions of the first and second contact electrodes on the passivation film at a same height within the second substrate, the first and second contact electrodes respectively electrically connected to the first and second touch conductive lines, wherein a plurality of first edges defining the portion of the first contact electrode face a plurality of second edges defining the portion of the second contact electrode, and
wherein at least two of the first edges extend in different directions and are substantially parallel to corresponding at least two of the second edges,
wherein the first and second contact electrodes are formed at a same time as a pixel electrode electrically connected to the drain electrode via the first contact hole,
wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions are alternately arranged.

10. The method of claim 9, wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions have a plurality of adjacent surfaces with respect to each other.

11. The method of claim 10, wherein the first and second electrode extending portions are formed at the same height within the second substrate by the gate insulating layer and the passivation film.

12. The method of claim 11, wherein the first electrode extending portion includes one or more first electrode extending portions and the second electrode extending portion includes one or more second electrode extending portions.

13. The method of claim 12, wherein the first and second contact electrodes are formed such that at least one first electrode extending portion protrudes from the first electrode contact portion toward the second contact electrode, and at least one second electrode extending portion protrudes from the second electrode contact portion toward the first contact electrode.

14. The method of claim 12, wherein the first and second contact electrodes are respectively substantially formed in a block letter "C" shape and in a reverse block letter "C" shape to engage with each other.

15. The method of claim 14, wherein the first and second electrode extending portions are each formed substantially in a right angle extending toward the second and first contact electrodes, respectively.

16. The method of claim 12, wherein the first contact electrode is formed such that the first electrode extending portion extends substantially in a "T" shape formed from a central portion of the first electrode contact portion toward the second contact electrode.

17. The method of claim 16, wherein the second contact electrode is formed such that two second electrode extending portions extend substantially in right angles from end portions of the second electrode contact portion toward the first contact electrode, so that the two second electrode extending portions are arranged to embrace the first electrode extending portion.

18. A liquid crystal display panel, comprising:
a touch spacer formed in a first substrate;
a common electrode formed to cover the touch spacer;
a first touch conductive line formed in a first direction in a second substrate opposite to the first substrate;
a second touch conductive line formed in a second direction substantially perpendicular to the first touch conductive line; and
first and second contact electrodes respectively electrically connected to the first and second touch conductive lines, portions of the first and second contact electrodes formed at a same height within the second substrate, wherein the portions of the first and second contact electrodes contact the common electrode by the touch spacer in a contact position, and wherein a plurality of first edges defining the portion of the first contact electrode face a plurality of second edges defining the portion of the second contact electrode,
wherein at least two of the first edges extend in different directions and are substantially parallel to corresponding at least two of the second edges,
wherein the second substrate comprises:
a gate line formed substantially in parallel with the first touch conductive line;
a gate insulating layer formed to cover the first touch conductive line and the gate a data line formed on the gate insulating layer substantially in parallel with the second touch conductive line;
a passivation film formed to cover the data line and having a first contact hole which exposes a portion of the data line; and a pixel electrode formed on the passivation film to be electrically connected to the data line, wherein the first and second touch conductive lines are formed at a same level as the gate line and the data line, respectively, so that a step difference exists between the first and second touch conductive lines, wherein the first contact electrode is formed on the passivation film and is electrically connected to the first touch conductive line via a second contact hole which penetrates the passivation film and the gate insulating layer, and the second contact electrode is formed on the passivation film and is electrically connected to the second touch conductive line via a third contact hole, wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions are arranged in a form for engaging with each other.

19. A liquid crystal display panel, comprising:

a touch spacer formed in a first substrate;

a common electrode formed to cover the touch spacer;

a first touch conductive line formed in a first direction in a second substrate opposite to the first substrate;

a second touch conductive line formed in a second direction substantially perpendicular to the first touch conductive line; and first and second contact electrodes respectively electrically connected to the first and second touch conductive lines, portions of the first and second contact electrodes formed at a same height within the second substrate, wherein the portions of the first and second contact electrodes contact the common electrode by the touch spacer in a contact position, and wherein a plurality of first edges defining the portion of the first contact electrode face a plurality of second edges defining the portion of the second contact electrode, wherein at least two of the first edges extend in different directions and are substantially parallel to corresponding at least two of the second edges, wherein the second substrate comprises:

a gate line formed substantially in parallel with the first touch conductive line;

a gate insulating layer formed to cover the first touch conductive line and the gate a data line formed on the gate insulating layer substantially in parallel with the second touch conductive line;

a passivation film formed to cover the data line and having a first contact hole which exposes a portion of the data line; and a pixel electrode formed on the passivation film to be electrically connected to the data line, wherein the first and second touch conductive lines are formed at a same level as the gate line and the data line, respectively, so that a step difference exists between the first and second touch conductive lines, wherein the first contact electrode is formed on the passivation film and is electrically connected to the first touch conductive line via a second contact hole which penetrates the passivation film and the gate insulating layer, and the second contact electrode is formed on the passivation film and is electrically connected to the second touch conductive line via a third contact hole, wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions have a plurality of adjacent surfaces with respect to each other, wherein the first and second electrode extending portions are formed at the same height within the second substrate by the gate insulating layer and the passivation film, wherein the first electrode extending portion includes one or more first electrode extending portions and the second electrode extending portion includes one or more second electrode extending portions, wherein the first and second contact electrodes are formed such that at least one first electrode extending portion protrudes from the first electrode contact portion toward the second contact electrode, and at least one second electrode extending portion protrudes from the second electrode contact portion toward the first contact electrode, wherein the first and second contact electrodes are respectively substantially formed in a block letter "C" shape and in a reverse block letter "C" shape to engage with each other.

20. The liquid crystal display panel of claim 19, wherein the first and second electrode extending portions are each formed substantially in a right angle extending toward the second and first contact electrodes, respectively.

21. A method for manufacturing a liquid crystal display panel, the method comprising:

forming a touch spacer in a first substrate;

forming a common electrode to cover the touch spacer;

forming a gate metal pattern having a gate line, a gate electrode, and a first touch conductive line in a second substrate opposite to the first substrate;

forming a gate insulating layer to cover the gate metal pattern;

forming a semiconductor layer on a portion of the gate insulating layer over the gate electrode;

forming a data metal pattern having a data line, a source electrode, a drain electrode, and a second touch conductive line over the gate metal pattern;

forming a passivation film to cover the data metal pattern, the passivation film having first to third contact holes which expose a portion of the drain electrode and portions of the first and second touch conductive lines, respectively; and forming portions of the first and second contact electrodes on the passivation film at a same height within the second substrate, the first and second contact electrodes respectively electrically connected to the first and second touch conductive lines, wherein a plurality of first edges defining the portion of the first contact electrode face a plurality of second edges defining the portion of the second contact electrode, and wherein at least two of the first edges extend in different directions and are substantially parallel to corresponding at least two of the second edges, wherein the first and second contact electrodes are formed at a same time as a pixel electrode electrically connected to the drain electrode via the first contact hole, wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions are arranged in a form for engaging with each other, wherein the first contact electrode comprises a first electrode contact portion electrically connected to the first touch conductive line via the second contact hole and a first electrode extending portion extending from the first electrode contact portion, and the second contact electrode comprises a second electrode contact portion electrically connected to the second touch conductive line via the third contact hole and a second electrode extending portion extending from the second electrode contact portion, wherein the first and second electrode extending portions have a plurality of adjacent surfaces with respect to each other, wherein the first and second electrode extending portions are formed at the same height within the second substrate by the gate insulating layer and the passivation film, wherein the first electrode extending portion includes one or more first electrode extending portions and the second electrode extending portion includes one or more second electrode extending portions, wherein the first and second contact electrodes are respectively substantially formed in a block letter "C" shape and in a reverse block letter "C" shape to engage with each other.

22. The method of claim 21, wherein the first and second electrode extending portions are each formed substantially in a right angle extending toward the second and first contact electrodes, respectively.

* * * * *